July 22, 1969 — R. F. McGIVERN — 3,456,804
FILTER BOTTOMS

Filed Oct. 26, 1966 — 2 Sheets-Sheet 1

INVENTOR.
ROBERT F. McGIVERN
BY MAHONEY, MILLER & RAMBO
ATTORNEYS

July 22, 1969 R. F. McGIVERN 3,456,804
FILTER BOTTOMS
Filed Oct. 26, 1966 2 Sheets-Sheet 2
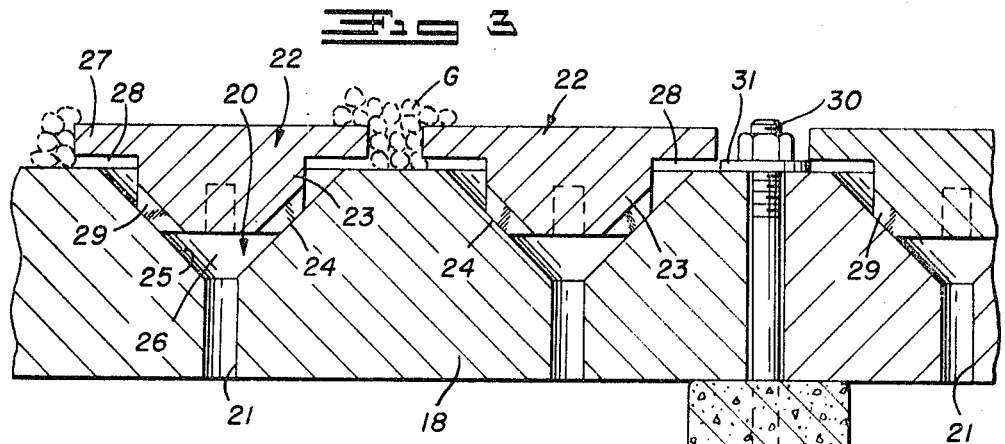
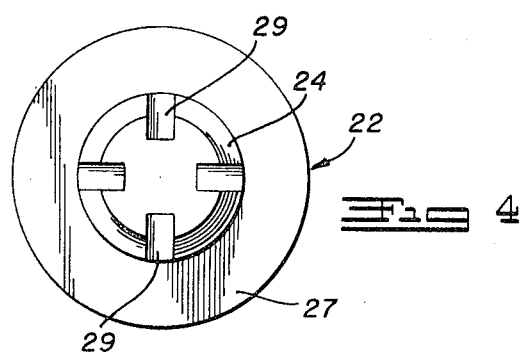
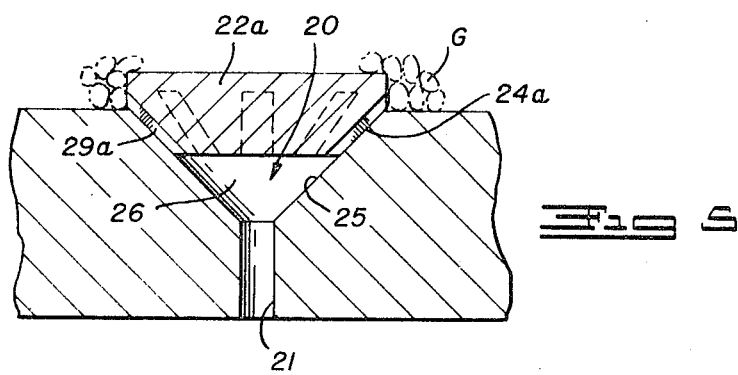
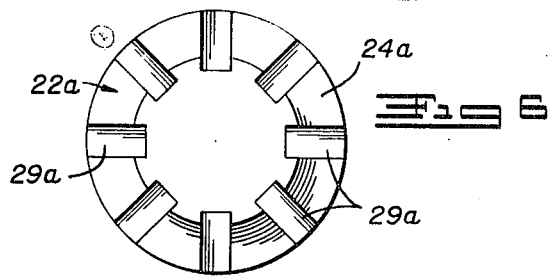
INVENTOR.
ROBERT F. McGIVERN
BY
MAHONEY, MILLER & RAMBO
BY
ATTORNEYS

United States Patent Office 3,456,804
Patented July 22, 1969

3,456,804
FILTER BOTTOMS
Robert F. McGivern, Worthington, Ohio (% M-C-G Corporation, 175 E. Broadway, Westerville, Ohio 43081)
Filed Oct. 26, 1966, Ser. No. 589,690
Int. Cl. B01d 23/18
U.S. Cl. 210—292    5 Claims

ABSTRACT OF THE DISCLOSURE

A filter bottom having sockets which receive nozzle members of one-piece construction that are held in the sockets solely by gravity or the weight of the filter bed. The nozzle members are so supported in the sockets that there is a lower plenum chamber below each nozzle member and upwardly and outwardly directed passages lead from that chamber to the filter bed.

---

My invention has to do, more particularly, with a filter bottom structure for the rapid sand-type filter having an underdrain system. The general structure of this type of filter bottom is illustrated in the patent to Crist No. 2,818,977, issued Jan. 7, 1958, but the present invention relates to important improvements in the nozzle arrangements provided in the filter bottom for drainage of water from the filter bed and inlet of wash water to the filter bed.

The nozzle arrangement of the present invention, like that disclosed in said patent, is so designed that the large particles of filter material, such as gravel, resting on the bottom adjacent the nozzle orifices will not tend to enter and clog those orifices. However, in addition, the nozzle arrangements of the present invention include means for effectively lowering the velocity of the wash water, which is under considerable pressure, as it enters the filter bed so that disturbance of the filter media, usually sand and gravel, will be prevented.

In the accompanying drawings, I illustrate examples of my present invention but it is to be understood that specific details may be varied without departing from basic principles of the invention.

In these drawings:

FIGURE 3 is a vertical sectional view taken along line 3—3 of FIGURE 2.

FIGURE 4 is a bottom plan view of one of the separate and removable nozzle members used in the structure of FIGURE 3.

FIGURE 5 is a vertical sectional view similar to FIGURE 3 showing a different form of nozzle arrangement.

FIGURE 6 is a bottom plan view of one of the separate and removable nozzle members used in the structure of FIGURE 5.

In general, the present invention provides a filter bottom made up of a plurality of support slab sections which may be of cast concrete or the like, and are adapted to support the filter bed. Each of these support sections is provided with a plurality of upwardly opening sockets for receiving nozzle members, each socket preferably being funnel-shaped with a single water-passage orifice located centrally in the bottom thereof and communicating with the main water passageways extending below the filter bottom. The nozzle members also may be of cast material and are inserted from the top of the support sections, each having a tapered undersurface which rests on the flared surface of the socket. The tapered undersurface of each nozzle member has a plurality of small, angularly-spaced slots formed therein to provide for restricted water-passages between the nozzle member and the supporting, flared surface of the cooperating socket. The upper ends of these passages are so arranged that the adjacent gravels at the lower side of the filter bed will not enter thereinto and clog them. Also, in the lower central portion of each socket, below the nozzle member, there results a plenum space or chamber with which the upper end of the central orifice, at the bottom of the socket, communicates. The result is that wash water, entering through the central orifice, expands in the plenum chamber and its velocity is greatly reduced, before it passes out through the plurality of angularly spaced passages provided between the cooperating surfaces of the nozzle member and socket. Consequently, no disturbance of the filter bed materials will occur.

The following description, with reference to the drawings, discloses two examples of the invention described broadly above but it is to be understood that many other examples incorporating this basic structure of the invention are possible.

Figure 1:
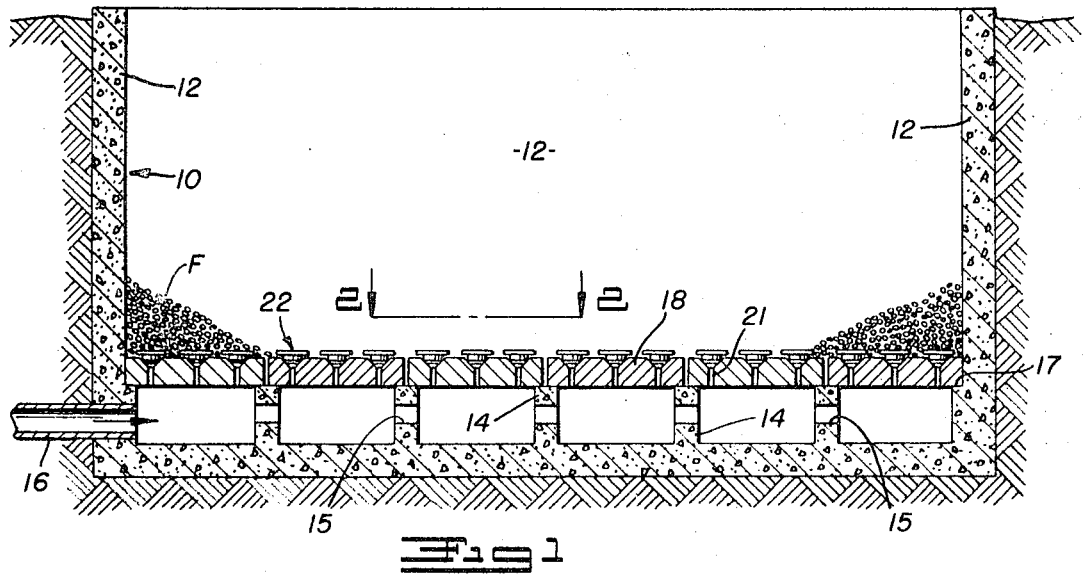
FIGURE 1 is a vertical sectional view showing a filter bottom embodying this invention provided in one type of filter tank.
Figure 2:
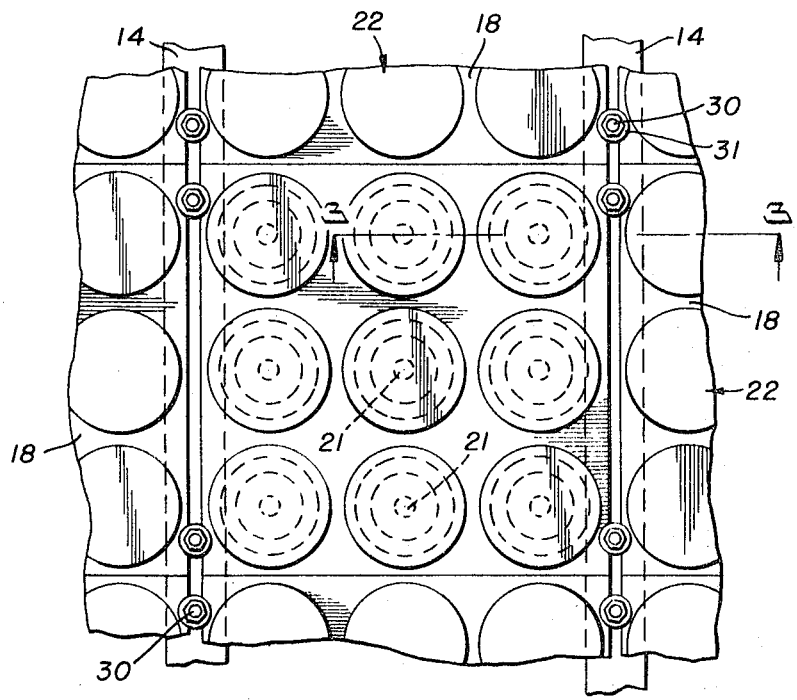
FIGURE 2 is an enlarged plan view taken from the position indicated at line 2—2 of FIGURE 1 and showing a portion of the filter bottom.

Referring particularly to the drawings, in FIGURES 1-4, inclusive, I have illustrated one form of my invention and its application to a filter tank 10 of one type. This tank is indicated as being formed of concrete with an integral bottom 11 and upstanding sides 12 but may be formed suitably of other material. Main water passageways 13 are provided across the tank between the upstanding piers 14 which are provided with suitable water passage openings 15 extending therethrough. Main influent and effluent ports or passages 16 connect with the outermost main passage 13.

The piers 14 and abutments 17 on the side walls 12 provide supports or shelves for receiving and supporting horizontally the slab sections 18 which are preferably of concrete or similar material. These sections 18 are of quadrangle form, preferably square, and they are supported and arranged in suitable number to form the filter bottom for the tank 10.

Each of the support sections 18 is provided with a plurality of upwardly opening sockets 20 which are arranged in a suitable regular pattern. Each socket is of funnel shape and communicates at its lower end with a vertical influent and effluent orifice 21 which extends on downwardly completely through the section 18 so as to communicate with one of the main water passages 13 which, in effect, is a large plenum chamber. Each of the upwardly opening sockets 20 is adapted to receive and support a nozzle member 22 which may also be cast of concrete. The nozzle member 22 is provided with a depending body 23 which has an annular, tapered or frusto-conical surface 24 that is complemental to and engages the flared surface 25 of the socket at a level spaced above the upper end of the orifice 21 so as to provide a lower plenum chamber 26. The upper portion of the nozzle member 22 is extended radially outwardly to provide a peripheral flange 27 which, when the surfaces 24 and 25 are in contact, provides a restricted annular, outwardly opening space 28 which also provides a plenum chamber. Extending between the lower plenum chamber 25 and the upper plenum chamber 28 are the restricted water passages 29 which are provided by grooves or slots formed at angularly spaced intervals in the lower, tapered surface 24 of the nozzle body 23.

The support sections 18 may be rested on the piers 14 and anchored to the piers by the bolt arrangements 30 which carry washers 31 on their upper ends that engage the upper surfaces of the sections 18. The nozzle members 22 are made as separate members which are merely inserted in the sockets 20. The filter bed material F will then be arranged in the tank on the filter bottom assembly and the weight of the material will hold the nozzle members 22 in position in the sockets 20. It will be noted that the annular, outwardly opening chamber 28 is so restricted that the larger gravels G at the bottom of the filter bed material will be of greater diameter than the depth or vertical extent of each chamber so that the gravels will not tend to enter into the chamber thereby causing clogging thereof.

The water being filtered will pass downwardly through the bed, out through the restricted chamber 28, downwardly through the angularly spaced passages 29, downwardly through the space 20, and finally out through the orifices 21 into the main passageways 13 from which the filtered water may be withdrawn through the passage 16.

When it is necessary to backwash the filter material, the water is forced under pressure through the passage 16 into the main passages 13 and upwardly through the restricted orifices 21 of the various nozzle members 22. At each nozzle member, the water will first enter the lower plenum chamber 26 and will expand, thereby greatly reducing its velocity. It will further pass upwardly through the restricted passages 29 into the plenum chamber 28 where its velocity will again be reduced. The water will continue on outwardly into the filter bed material to backwash the material but will be at greatly reduced velocity as compared to its inlet velocity at the orifice 21 so as not to disturb the filter material of the bed.

In FIGURES 5 and 6, a slightly different form of nozzle member is illustrated. In this instance, the nozzle member 22a does not include the flange 27 but has the tapered surface 24a that rests on the flared surface 25 of the socket 20. The lower plenum chamber 26 is provided as before with the orifice 21 communicating therewith. The tapered surface 24a of the nozzle member 22a is provided with the angularly spaced, restricted passages 29a formed therein and the upper ends of these passageways extend to the peripheral edge of the nozzle member above the upper surface of the support section 18 so that the upper ends of these passages communicate directly with the filter bed. These upper ends of the passages 29a are restricted compared to the size of the gravels G being of smaller size than the diameter of the gravels so that the gravels will not tend to enter therein and clog them.

This arrangement will function substantially like the one described above except that the second upper plenum chamber, like the plenum chamber 28, is not provided but the flow of backwash water is directly from the restricted passages 29a outwardly and upwardly into the filter bed.

It will be apparent from the above that this invention provides a filter bottom which is composed of the separate support sections that have the upwardly opening sockets for receiving the nozzle members. The nozzle members fit into the sockets so as to provide the lower plenum space and provide for the series of annular spaced passages between the nozzle member and its seating socket surface so as to reduce the velocity of water entering through the single centrally disposed orifice communicating with the bottom of the socket. The upper ends of the restricted passages between the nozzle member and its supporting socket surface are so arranged that the adjacent large gravels at the bottom of the bed will not tend to enter thereinto and cause clogging thereof. The nozzle members will be held in place by the weight of the filter bed but may be removed and replaced, if necessary. The manufacture of the support sections and the nozzle members and assembly and positioning thereof is facilitated because they are made separately. Thus, the cost and installation of the filter bottom is reduced.

Having thus described this invention, what is claimed is:

1. A filter bottom comprising a support section having an upper filter bed supporting surface and having a vertically disposed influent and effluent orifice therein open at its lower end, a plenum chamber in the section with which the upper end of the orifice communicates, and water passage means for conducting the water upwardly from said plenum chamber to the upper surface of said section, said support section having an upwardly opening socket with a support surface, a separate nozzle member disposed in said socket and having a surface engaging said socket surface but being free from securement thereto, said nozzle member being of single-piece construction with a top supporting surface of substantial area which extends above an adjacent surface of the section and supports the filter bed and being maintained in said socket solely by gravity and the weight of the filter bed, said nozzle member having a lower side spaced above the upper end of said orifice to provide said plenum chamber, said water passage means comprising a plurality of water-conducting passages formed between the engaging surfaces of said nozzle member and said socket which communicate at their lower ends with said plenum chamber and extend upwardly with their upper ends at a level above the upper surface of said section.

2. A filter bottom according to claim 1 in which said nozzle member has an annular space formed therein at a level above said upper supporting surface which opens outwardly and with which the upper ends of said passages communicate.

3. A filter bottom according to claim 2 in which said annular space is provided by an outwardly extending peripheral flange on said nozzle member which is spaced above the level of said upper supporting surface.

4. A filter bottom according to claim 1 in which said support section is of quadrangle form and has a plurality of laterally spaced, upwardly opening sockets formed therein with said nozzle members resting therein.

5. A filter bottom according to claim 4 made of a plurality of said sections disposed in a tank having means for supporting it at a selected level, said tank having influent and effluent passages below the bottom communicating with said orifices therein.

References Cited
UNITED STATES PATENTS

| | | | |
|---|---|---|---|
| 493,937 | 3/1893 | Moore | 210—292 X |
| 2,155,964 | 4/1939 | Bowers et al. | 210—292 |
| 2,528,065 | 10/1950 | Lundberg | 210—293 |
| 2,754,971 | 7/1956 | Lawlor | 210—292 X |
| 2,818,977 | 1/1958 | Crist | 210—291 |

SAMIH N. ZAHARNA, Primary Examiner

U.S. Cl. X.R.

210—293